United States Patent [19]

Hara

[11] 4,377,898
[45] Mar. 29, 1983

[54] WIRE END PROCESSING APPARATUS

[75] Inventor: Akinori Hara, Akishima, Japan

[73] Assignee: Osawa Press Mfg., Co., Ltd., Tokyo, Japan

[21] Appl. No.: 238,146

[22] Filed: Feb. 25, 1981

[30] Foreign Application Priority Data

Oct. 28, 1980 [JP] Japan .................................. 55-151073

[51] Int. Cl.³ ............................................... H02G 1/12
[52] U.S. Cl. ..................................... 29/564.1; 81/9.51
[58] Field of Search ................ 29/564.4, 564.1, 33 M; 81/9.51

[56] References Cited

U.S. PATENT DOCUMENTS 3,570,100 3/1971 Kindell et al. ...................... 29/564.4
3,659,328 5/1972 Klein ............................. 29/564.4 X
4,249,433 2/1981 Hava ..................................... 81/9.51

Primary Examiner—James M. Meister
Attorney, Agent, or Firm—Darby & Darby

[57] ABSTRACT

A wire end processing apparatus comprises a first moving means operable to first move a first wire clamp means away from a cutter means along the path of travel of an insulated wire and then to move the first wire clamp means toward the cutter means obliquely relative to the path of travel of the wire to thereby bring the leading end to the insulated wire into a first terminal fastening means; a second moving means operable to first move a second wire clamp means away from the cutter means and then to move the second clamp means toward the cutter means obliquely relative to the path of travel of the wire to thereby bring the trailing end of the wire length into a second terminal fastening means.

7 Claims, 21 Drawing Figures

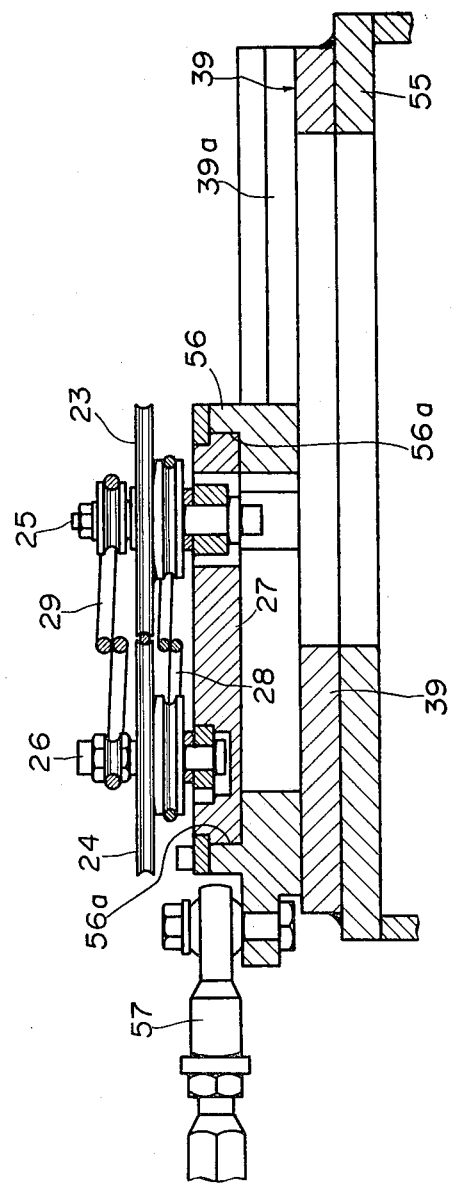

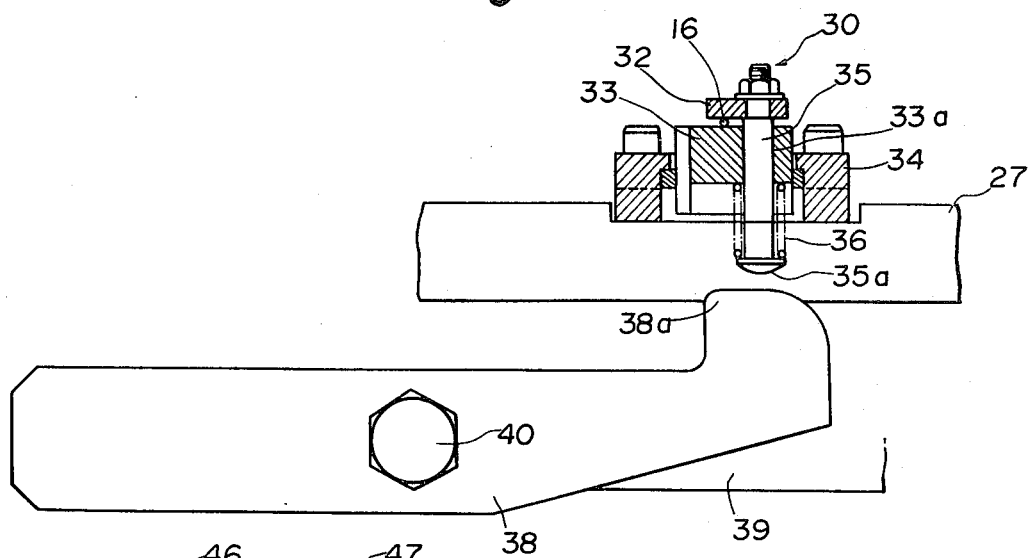
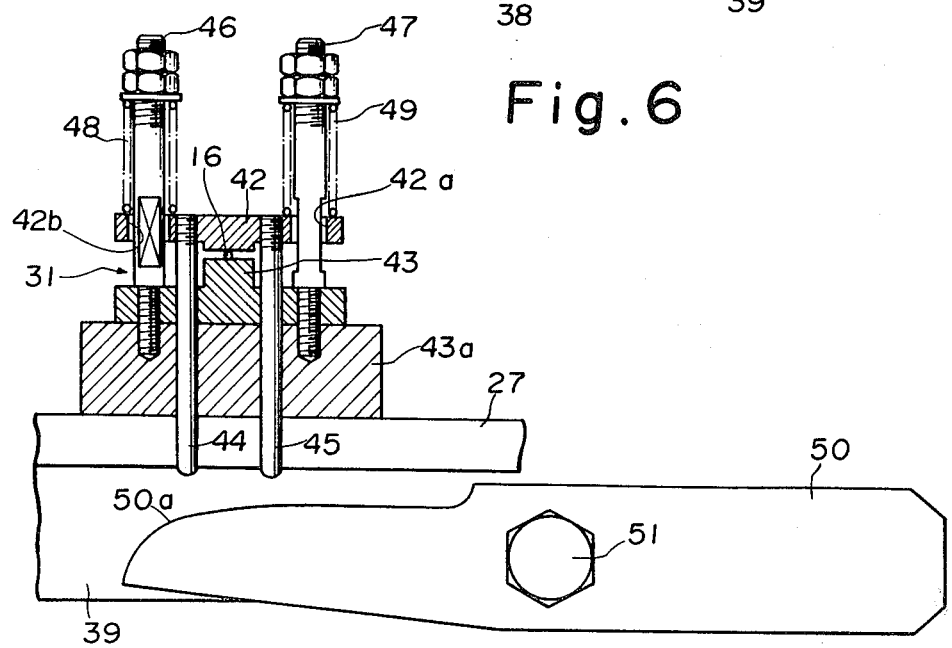

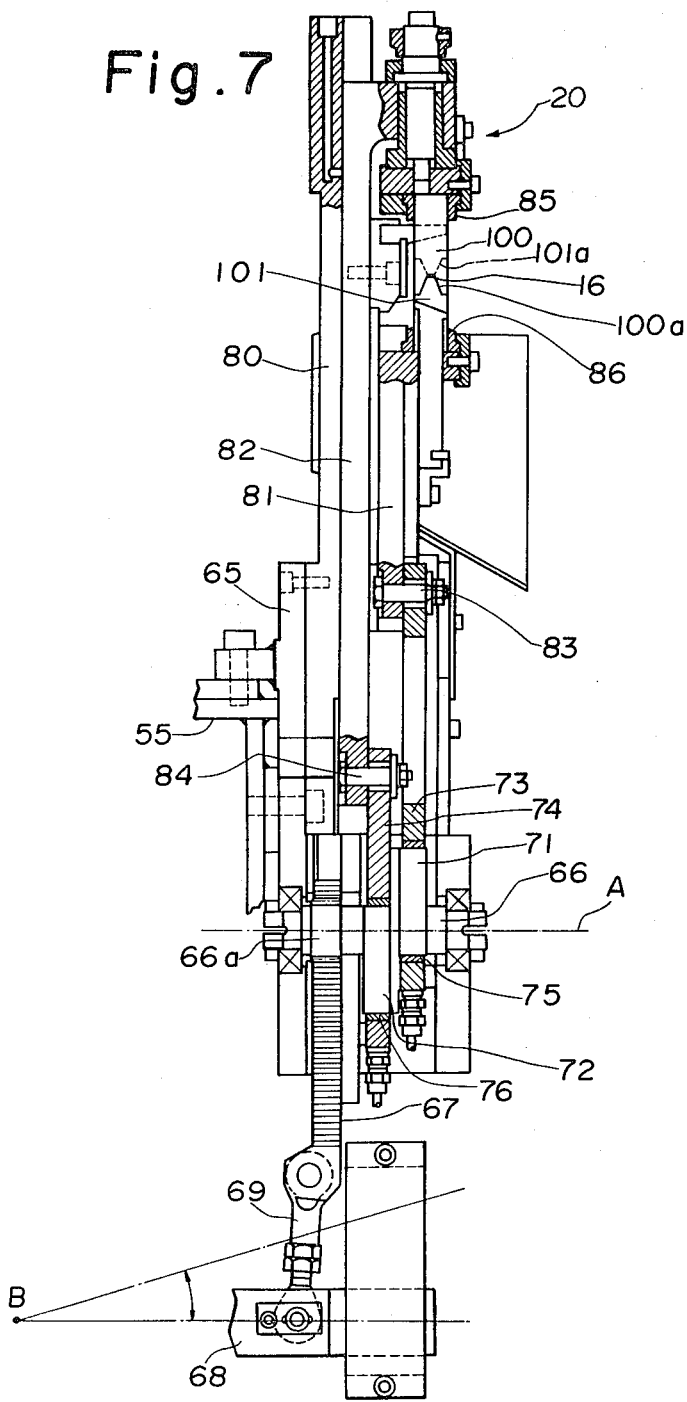

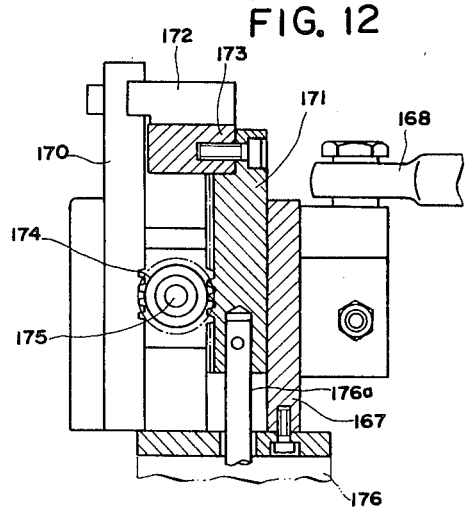
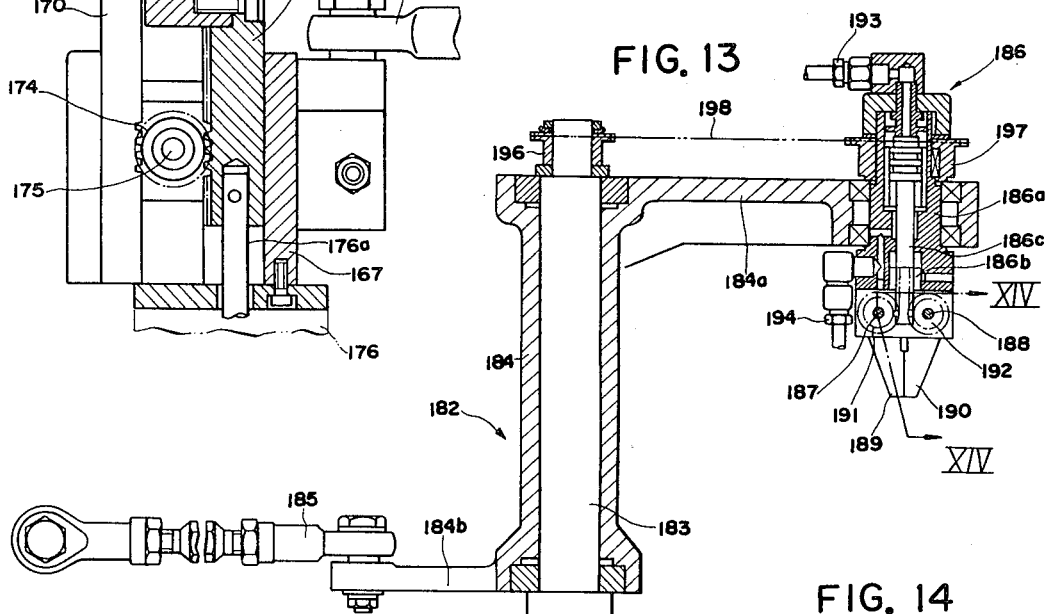
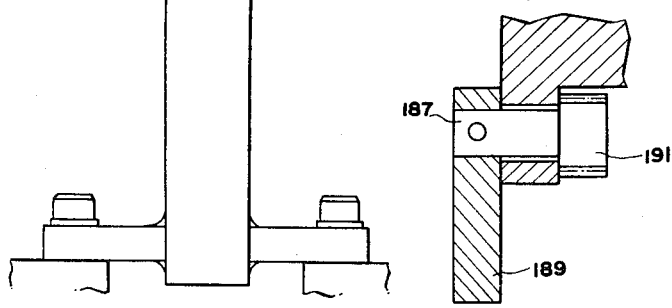

WIRE END PROCESSING APPARATUS

BACKGROUND OF THE INVENTION

1. Field of the Invention

This invention relates to a wire end processing apparatus of the type in which a continuous insulated wire is cut to a predetermined length so that electric terminals are fastened to the ends of the wire length so cut.

2. Prior Art

It has been desired in the electrical and electronic industry to automatically cut a continuous insulated wire into a predetermined length and to automatically fasten electric terminals to the opposite ends of the wire length so cut.

SUMMARY OF THE INVENTION

It is therefore an object of this invention to provide a wire end processing apparatus of the type in which electric terminals are automatically fastened to the opposite ends of a wire length cut from a continuous insulated wire.

According to the present invention, there is provided a wire end processing apparatus which comprises a wire feed means for advancing an insulated wire a predetermined length; a cutter means operable to cut the insulated wire to a predetermined length; a first clamp means arranged on the wire inlet side of said cutter means and operable to clamp the wire; a second clamp means arranged on the wire outlet side of said cutter means and operable to clamp the wire; a first fastening means for fastening a terminal to the leading end of the wire; a second fastening means for fastening a terminal to the trailing end of the wire length; a first moving means operable to first move said first clamp means away from said cutter means along the path of travel of the wire and then to move said first clamp means toward said cutter means obliquely relative to the path of travel of the wire to thereby bring the leading end of the insulated wire into said first fastening means; and a second moving means operable to first move said second clamp means away from said cutter means along the path of travel of the wire and then to move said second clamp means toward said cutter means obliquely relative to the path of travel of the wire to thereby bring the trailing end of the wire length into said second fastening means.

Other advantages, features and additional objects of the present invention will become manifest to those versed in the art upon making reference to the detailed description and the accompanying sheets of drawings in which a preferred embodiment incorporating the principles of the present invention is shown by way of an illustrative example.

BRIEF DESCRIPTION OF THE DRAWINGS

FIG. 4 is a cross-sectional view taken along the line IV—IV of FIG. 3;

FIG. 5 is a cross-sectional view of a first clamp means;

FIG. 6 is a cross-sectional view of a second clamp means;

FIG. 7 is a partly broken, side elevational view of a cutter and stripper mechanism;

FIG. 12 is a cross-sectional view of a wire clamp means encircled as at XII in FIG. 9;

FIG. 13 is a cross-sectional view of a wire transport means;

FIG. 14 is an enlarged, cross-sectional view taken along the line XIV—XIV of FIG. 13;

DESCRIPTION OF THE PREFERRED EMBODIMENT

Figure 1:
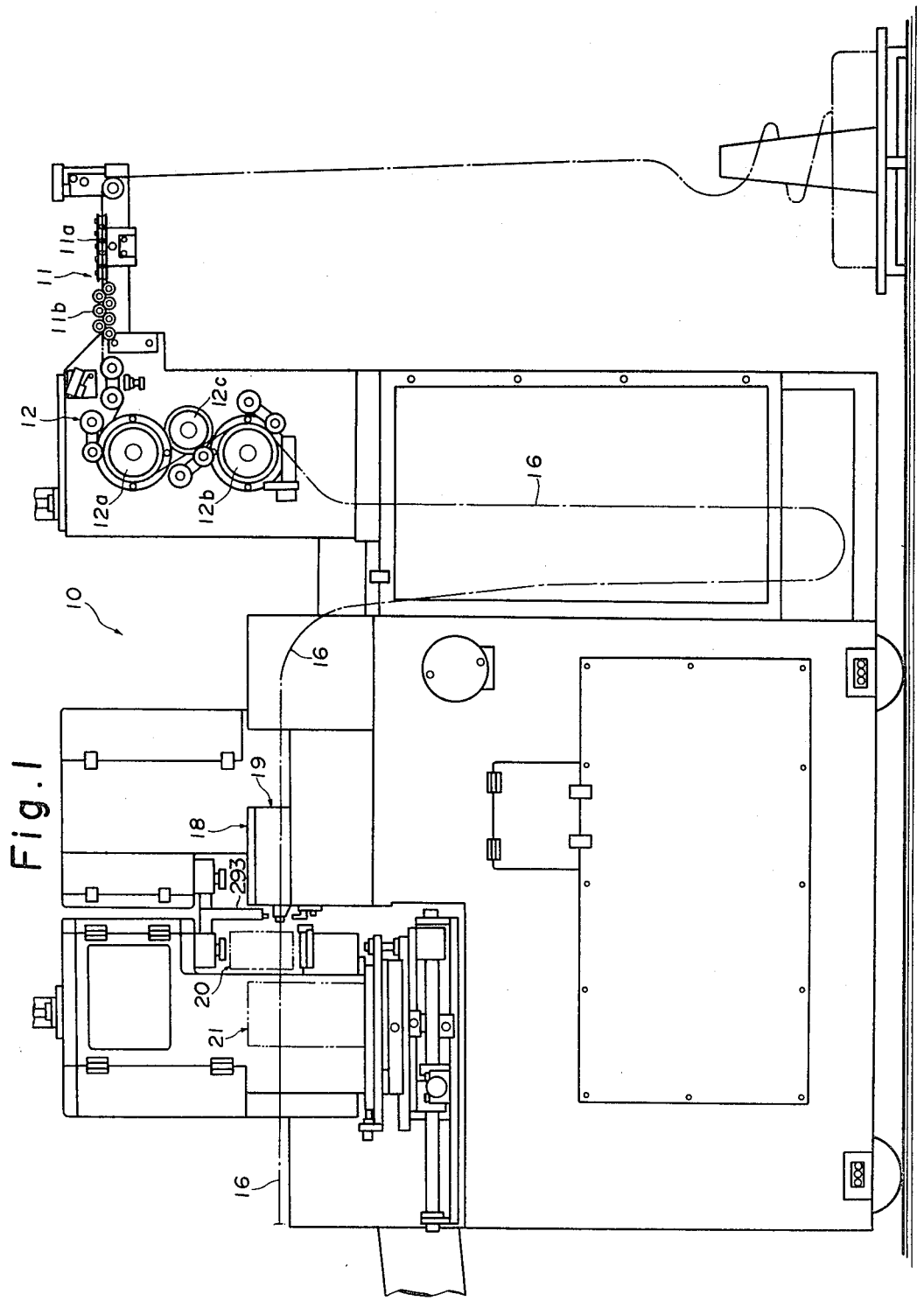
FIG. 1 is a front elevational view of a wire end processing apparatus provided in accordance with this invention.
Figure 2:
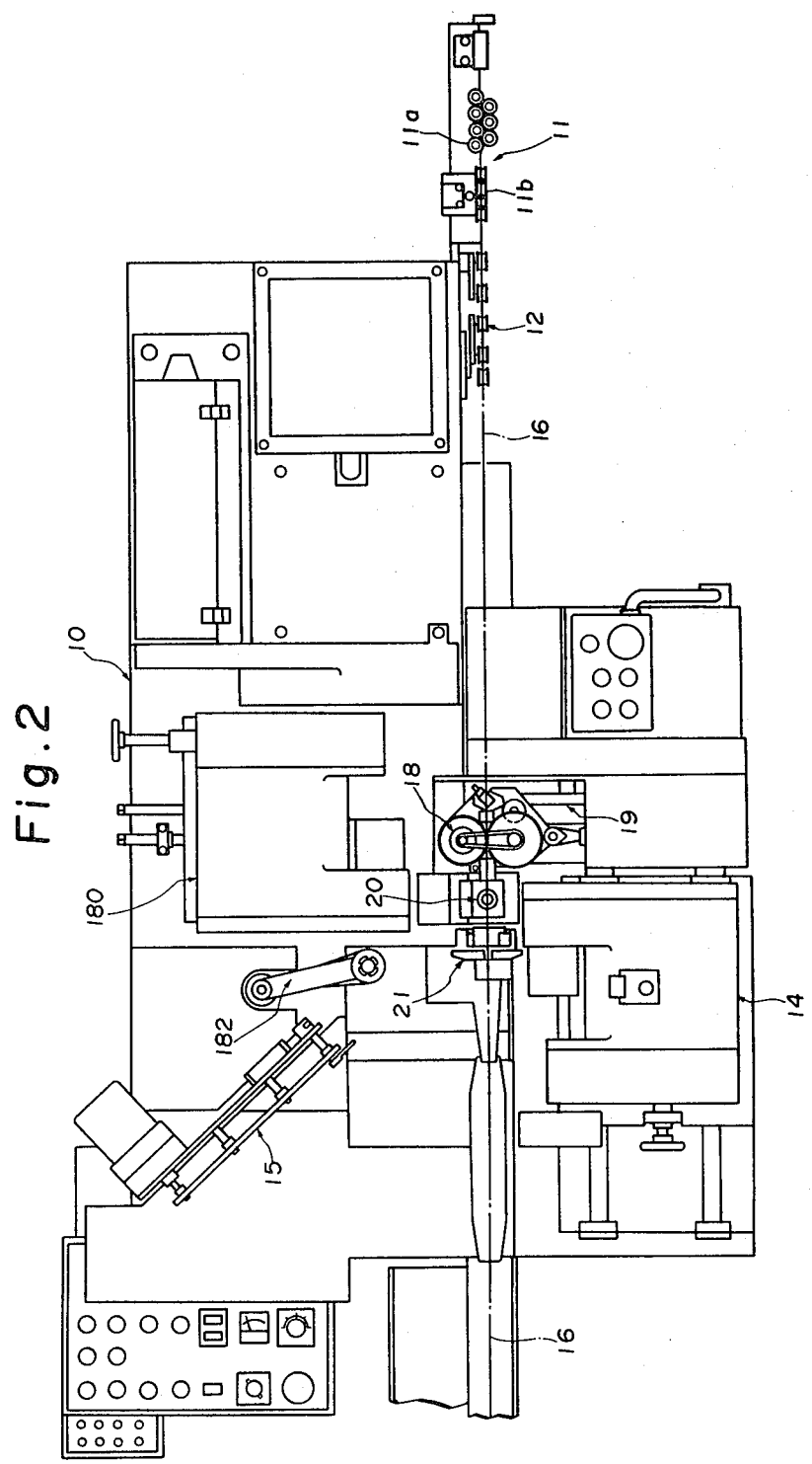
FIG. 2 is a top plan view of the apparatus.

FIGS. 1 and 2 show apparatus 10 for processing ends of an insulated wire. The apparatus 10 comprises a wire straightening means 11, a wire length measuring means 12, a wire feed means 18, a cutter and stripper mechanism 20, first and second moving mechanisms 19, 21, first and second terminal fastening devices 14, 180, a transport mechanism 182, and a conveyor means 15. The wire straightening means 11 includes a pair of roller assemblys 11a, 11b, the roller assembly 11a having a first row of side rollers and a second row of side rollers urged against the first row of rollers while the roller assembly 11b has a row of upper rollers and a row of lower rollers urged against the row of upper rollers. The insulated wire 16 supplied from a spool 17 passes between the first and second rows of rollers of the roller assembly 11a and the rows of upper and lower rollers of the roller assembly 11b. The wire straightening means 11 serves to straighten the wire 16 which has been wound around the spool 17. The wire length measuring device 12 comprises a drive pulley 12a, a driven pulley 12b and an encorder 5 disposed therebetween. The wire 16 transported from the wire straightening means 12 is passed through the drive and driven pulleys 12a, 12b, the wire being held taut between the two pulleys 12a, 12b. The encorder 12c is held in contact with the insulated wire 16 for rotation so that the encorder feeds a sensing signal to a drive means (not shown) to control the same after a predetermined length of wire 16 is delivered through the wire length measuring device 12, the drive means serving to drive the drive pulley 12a for rotation. Thus, the wire 16 is intermittently advanced by the predetermined length. When the wire is fed more than the predetermined length due to slippage, the encorder delivers a control signal to the drive means to rotate the drive pulley in a reverse direction to compensate for this excessive amount of wire.

Figure 3:
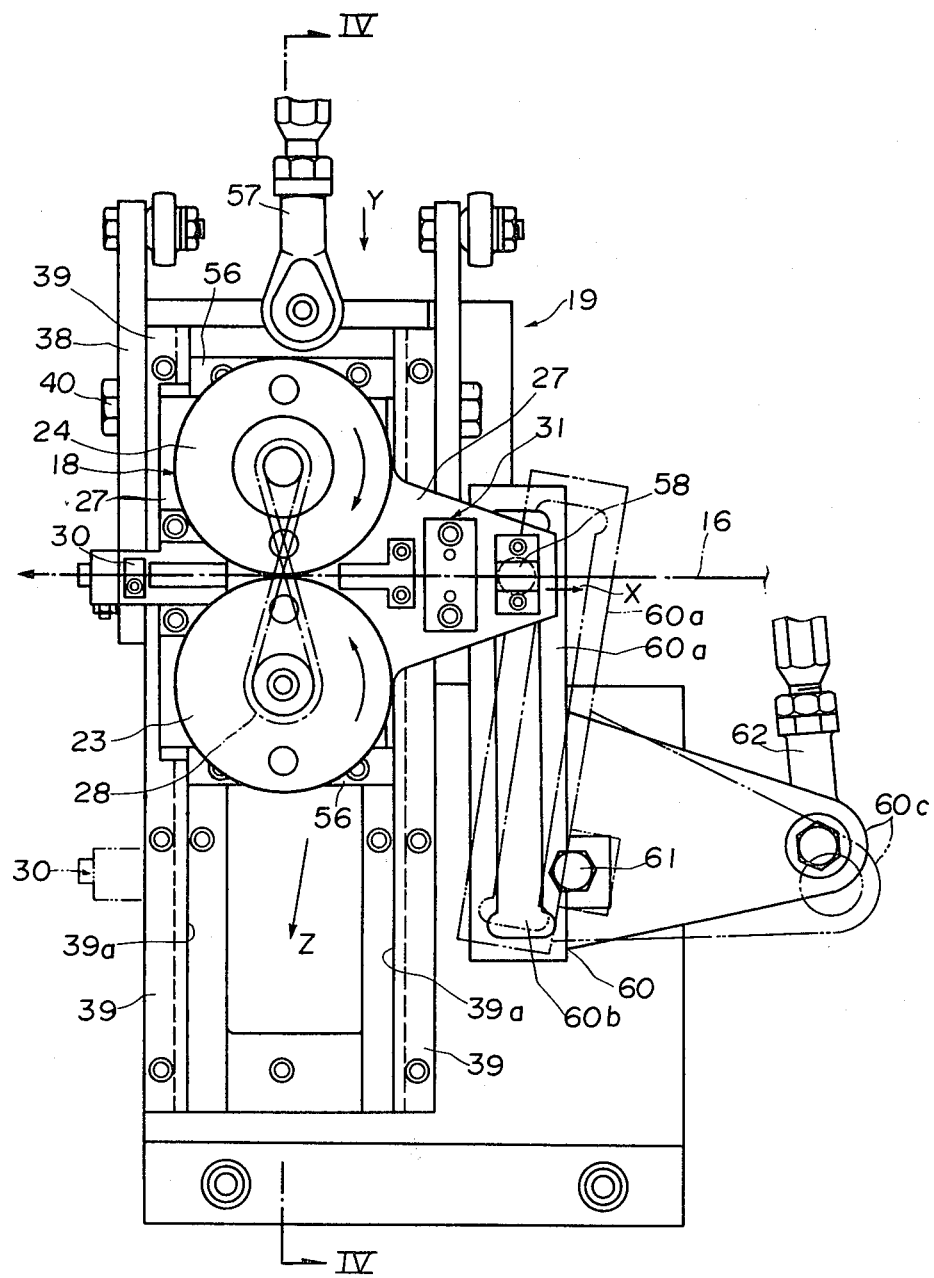
FIG. 3 is a top plan view of a first moving mechanism and wire feed means.

Referring to FIGS. 3 and 4, the wire feed means 18 comprises a pair of drive and driven pulleys 23, 24 mounted on respective shafts 25, 26 which are rotatably mounted on a movable table 27, the two pulleys 23, 24 being disposed in opposed relation to each other. The shaft 25 is connected to a drive means (not shown) for being driven for rotation. The drive and driven pulleys 23, 24 are rotated in opposite directions by a cross-loaded belt 28 arranged thereon. The two pulleys 23, 24 are urged toward each other by a spring 29 arranged on the shafts 25, 26 so that the insulated wire 16 is gripped by the peripheries of the pulleys 23, 24. Thus, the wire 16 is intermittently advanced by the pulleys 23, 24 by a predetermined length.

As best shown in FIG. 3, a first clamp means 30 and a second clamp means 31 are provided on the movable table 27 in the path of travel of the insulated wire 16, these clamp means 30, 31 serving to clamp the wire 16 against movement. As shown in FIG. 5, the first clamp means 30 comprises a pair of opposed upper and lower jaws 32, 33, the lower jaw 33 being secured to the movable table 27 through a mounting means 34 and having a vertical hole 33a formed therethrough. A pin 35 is slidably received in the hole 33a and has an upper end secured to the upper jaw 32, the pin having a head portion 35a at its lower end. A coil spring 36 is wound around the pin 35 and acts between the head portion 35a and the underside of the lower jaw 33 so that the upper jaw 32 is normally urged toward the lower jaw 33 under a predetermined load. An actuator arm 38 is pivotally mounted on a guide member 39 by a shaft 40, and is engageable at one end 38a with the head portion 35a to urge the upper jaw 32 away from the lower jaw 33. The actuator arm 38 is actuated by a drive means (not shown). The insulated wire 16 is introduced between and gripped by the upper and lower jaws 32, 33.

As shown in FIG. 6, the second clamp means 31 includes a pair of opposed upper and lower jaws 42, 43, the lower jaw 43 being secured to the movable table 27 through a mounting means 43a. A pair of pins 44, 45 are secured at their upper ends to the upper jaw 42 and slidably extend through the lower jaw 43, the mounting means 43a and the movable table 27, the lower ends of the pins 44, 45 extending downwardly from the movable table 27.

A pair of stud bolts 46, 47 are loosely fitted in respective aperatures 42a, 42b of the upper jaw 42 and extend into the lower jaw 43 and the mounting means 43a. A pair of coil springs 48, 49 are mounted around the stud bolts 46, 47, respectively, and act between the upper surface of the upper jaw 42 and the upper portions of the stud bolts 46, 47. With this arrangement, the upper jaw 42 is normally urged by the coil springs 48, 49 toward the lower jaw 43. An actuator arm 50 is pivotally mounted on the guide member 39 by a shaft 51, and is engageable at one end 50 with the lower ends of the pins 44, 45 to urge the upper jaw 42 away from the lower jaw 43. The actuator arm 50 is actuated by a drive means (not shown). The insulated wire 16 is introduced between and gripped by the upper and lower jaws 42, 43. The cooperating surfaces of jaws 32, 33 and jaws 42, 43 are made coarse to facilitate the gripping of the wire 16.

Figure 8:
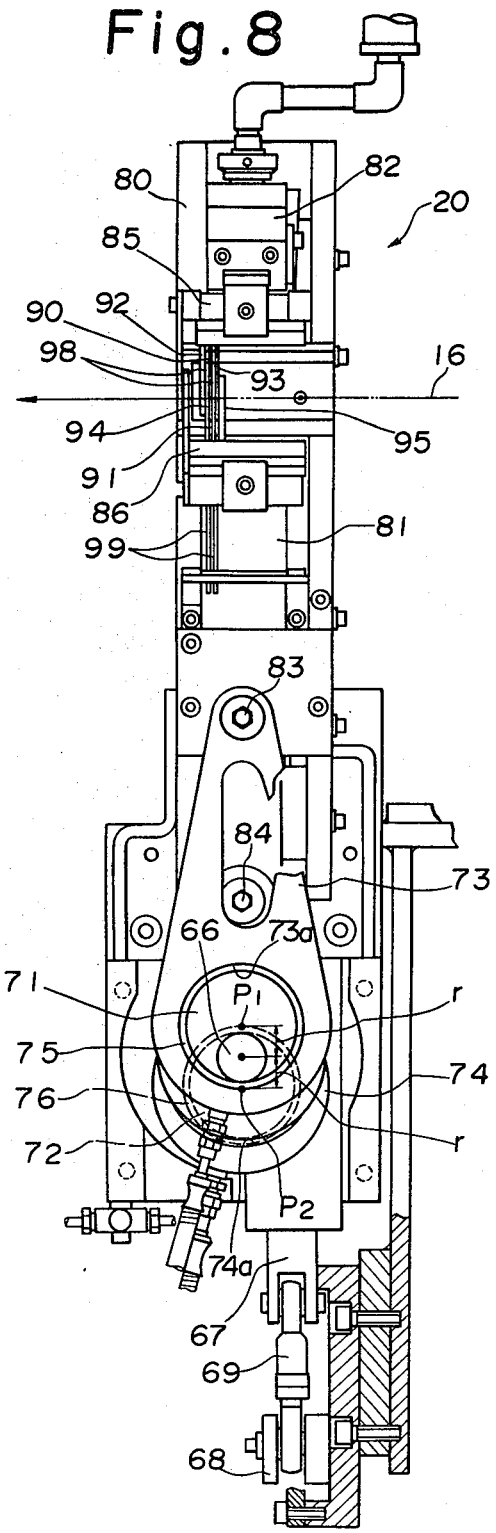
FIG. 8 is a front elevational view of the cutter and stripper mechanism.

Referring to FIGS. 3 to 6, the first moving mechanism 19 includes the guide member 39 mounted on a frame 55, the guide member 39 being disposed horizontally and having a guide groove 39a extending perpendicular to the path of travel of the insulated wire 16. A cross slide 56 is mounted on the guide member 39 and is movable along the guide groove 39a. The cross slide 56 has a guide groove 56a extending parallel to the path of travel of the insulated wire 16. The movable table 27 is mounted on the cross slide 56 and is movable along the guide groove 56a. A piston rod 57 is connected to the cross slide 56 to actuate the same to move along the guide groove 39a. A guide roller 58 is secured to the underside of the movable table 27. A pivotal member 60 is pivotally mounted on the frame 55 by a bolt 61, the pivotal member 60 having an elongated portion 60a with a guide groove 60b normally disposed perpendicular to the path of travel of the insulated wire 16. The guide roller 58 is received in the guide groove 60b for movement therealong. The pivotal member 60 has an arm portion 60c to which an actuator rod 62 is connected to actuate the pivotal member 60 to be pivotally moved about the shaft 61. The actuator rod 62 is actuated by a drive means (not shown) the cutter and stripper mechanism 20 is provided. Referring to FIGS. 7 and 8, a vertical mounting member 65 is mounted on the frame 55. A crank shaft 66 is supported by the mounting member 65 for rotation about its axis A disposed horizontally. A pinion 66a is formed on one end portion of the crank shaft 66, the pinion 66a meshingly engaging a rack 67 supported by the mounting member 65 for vertical movement. The rack 67 is coupled at its lower end to an actuator 68 through a connecting link 69, the actuator 68 being driven by a drive means (not shown) for swinging movement about its pivot point B as indicated in phantom in FIG. 7 so that the rack 67 is vertically moved to rotate the crank shaft 66 through the pinion 66a. A pair of eccentric discs 71, 72 of the same diameter are mounted on the crank shaft 66 for rotation therewith. The two discs 71, 72 are mounted on the crank shaft 66 in diametrically opposed relation, and the centers $P_1$, $P_2$ of the two discs 71, 72 are offset by an equal distance r from the axis A of the crank shaft 66 in opposite directions. Thus, the centers $P_1$, $P_2$ lie in a common line passing through the axis A of the crank shaft 66. A pair of elongated connecting members 73, 74 of identical make have identical circular apertures 73a, 74a formed therethrough, respectively. The pair of eccentric discs 71, 72 are rotatably fitted in the respective apertures 73a, 74a through annular bearing members 75, 76. A vertical guide member 80 is secured to the mounting member 65 and extends upwardly beyond it. A pair of elongated slide member 81, 82 are mounted on the guide member 80 for vertical sliding movement therealong, the two slide members being slidable independently of each other. The lower ends of the slide members 81, 82 are pivotally connected by pins 83, 84 to the upper ends of the connecting members 73, 74, respectively. A pair of opposed upper and lower cutter holders 85, 86 are secured to the upper ends of the slide members 82, 81, respectively. As shown in FIG. 8, the insulated wire 16, fed from the wire feed means 18, is passed between the upper and lower cutter holders 85, 86 from right to left.

A pair of upper and lower cutter blades 90, 91 are mounted on the upper and lower cutter holders 85, 86, respectively. A pair of upper stripper blades 92, 93 are mounted on the upper cutter holder 85 on opposite sides of the upper cutter blade 90. Similarly, a pair of lower stripper blades 94, 95 are mounted on the lower cutter holder 86 on opposite sides of the lower cutter blade 91.

The upper and lower stripper blades 92, 94 and the upper and lower stripper blades 93, 95 cooperate respectively to cut through the insulation of the insulated wire 16 on opposite sides of the cutter blades 90, 91. Insulation removing elements 98, 99 are fixedly mounted on the guide member 80 for removing the severed insulations disposed between the cutter blades and the respective stripper blades. A pair of centering plates 100, 101 are mounted on the upper and lower cutter holders 85, 86, respectively, the centering plates 100, 101 having a pair of cooperating V-shaped notches 100a, 101a for placing the insulated wire 16 at a proper position during the cutting and stripping operation.

Figure 9:
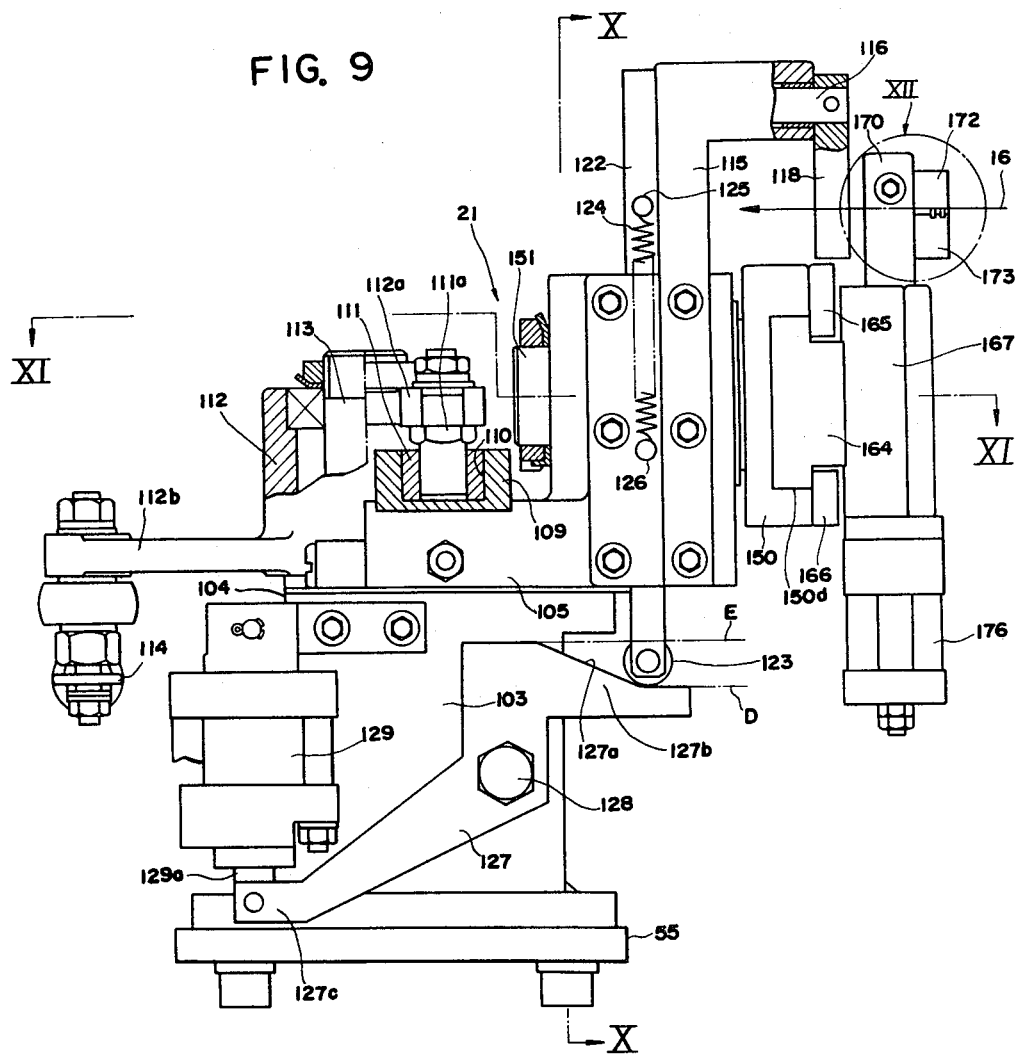
FIG. 9 is a side elevational view of a second moving mechanism.
Figure 10:
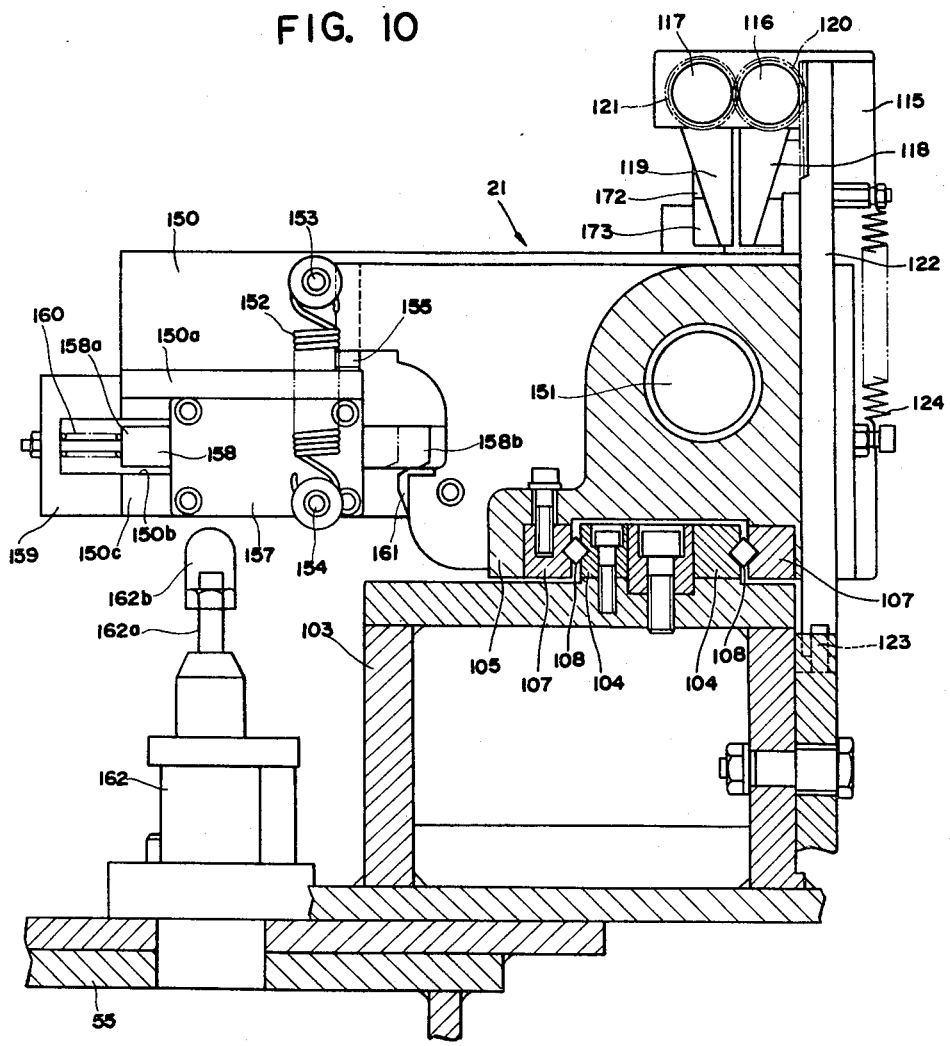
FIG. 10 is a cross-sectional view taken along the line X—X of FIG. 9.

The second moving mechanism 21 is described with reference to FIGS. 9 to 12. A support member 103 is mounted on the frame 55, and a guide rail 104 is mounted on the upper portion of the support member 103, the guide rail 104 extending parallel to the path of travel of the insulated wire 16. A carriage 105 is mounted on the guide rail 104 through guide elements 107, 108 for sliding movement therealong. A guide member 109 is mounted on the carriage 105 and has a guide groove 110 extending perpendicular to the path of travel of the wire 16. A slide member 111 is received in the guide groove 110 for sliding movement therealong. A crank member 112 is pivotally mounted on the support member 103 by a vertically disposed shaft 113. A pin 111a is mounted on one end 112a of the crank member 112 and rotatably received in the slide member 111. An actuator rod 114 is connected to the other end 112b of the crank member 112 for pivotally moving the latter about the shaft 113 so that the carriage 105 is moved along the guide rail 104. The actuator rod 114 is driven by a drive means (not shown). A mounting member 115 is mounted on the right end of the carriage 105 (FIG. 9). A pair of shafts 116, 117 are rotatably supported by the upper portion of the mounting member 115, the two shafts being extending parallel to the path of travel of the wire 16. A pair of jaws 118, 119 are secured to respective right ends of the shafts 116, 117 (FIG. 9) while a pair of pinions 120, 121 are mounted on the left ends of the shafts 116, 117, the pinions 120, 121 being in mesh with each other. A rack 122 is vertically movably supported by the carriage 105 and is in mesh with the pinion 120. A roller 123 is rotatably mounted on the lower end of the rack 122. The vertical movement of the rack 122 causes the pair of jaws 118, 119 to angularly move about the respective shafts 116, 117 toward and away from each other. When the rack 122 is in its lower position with the lower portion of the roller 123 disposed in a position D (FIG. 9), the jaws 118, 119 are held in their gripping positions as shown in FIG. 10 with the jaws held apart from each other by a distance substantially equal to the diameter of the insulated wire 16. The pair of jaws 118, 119 serve to properly position the insulated wire. The rack 122 is normally urged downwardly by a tension spring 124 acting between pins 125, 126 secured to the rack 122 and the carriage 105, respectively. A crank member 127 is pivotally mounted on the support member 103 by a shaft 128, the crank member having a cam surface 127a at its one end 127b. The roller 123 is held in rolling engagement with the cam surface 127a so that the lower portion of the roller 123 is moved between the upper and lower positions E and D (FIG. 9) when the carriage 105 moves along the guide rail 104. The other end 127c of the crank member 127 is connected to a piston rod 129a of a pneumatic cylinder 129 mounted on the support member 103.

A pivotal member 150 of generally rectangular shape is pivotally mounted on the right end portion of the carriage 105 (FIG. 9) by a shaft 151 extending parallel to the path of travel of the wire 16, the pivotal member 150 being disposed perpendicular to the path of travel of the wire. A tension spring 152 acts between a pair of pins 153, 154 secured to the carriage 105 and the pivotal member 150, respectively. The pivotal member 150 is normally held in its upper position with an upper projection 150a held against the lower end of a stop screw 155 fastened to the carriage 105. The screw 155 can be vertically adjusted by rotating the same about its axis. The pivotal member 150 has a slot 150b disposed between the upper projection 150a and a lower projection 150c. A cover plate 157 is secured to the pivotal member 150 to cover the major portion of the slot 150b. A retaining bar 158 is slidably received in the slot 150b. A spring holder 159 is secured to the end of the pivotal member 150, and a compression spring 160 acts between the spring holder 159 and one end 158a of the retaining bar 158 to normally urge the bar 158 in a right-hand direction (FIG. 10) so that the other end 158b of the retaining bar 158 is normally held in engagement with a retaining plate 161. In this condition, the end 158b is disposed in contact with the upper edge of the retaining plate 161. The lower edge of the end 158b of the retaining bar 158 and the upper edge of the retaining plate 161 are chamfered. A pneumatic cylinder 162 having a piston rod 162a operatively associated therewith is mounted on the frame 55, and the head 162b of the piston rod 162a is disposed immediately beneath the left end portion (FIG. 10) of the pivotal member 150. As shown in FIG. 9, the pivotal member 150 has a guide channel 150d extending along the length thereof, the guide channel 150d being disposed perpendicular to the path of travel of the wire. A slider member 164 is received in the guide channel 150d for sliding movement therealong. A pair of upper and lower guide plates 165, 166 are secured to the pivotal member 150 to guide the movement of the slider member 164 along the guide channel 150d. A movable block 167 is fixedly secured to the outer surface of the slider member 164. An actuator rod 168 is connected to the movable block 167 for moving the same along the guide channel 150d, the actuator rod 168 being driven by a drive means (not shown). As shown in FIG. 12, a pair of first and second racks 170, 171 are mounted on the movable block 167 for vertically sliding movement. The movable block 167 includes a wire clamp means which comprises a pair of opposed upper and lower jaws 172, 173 secured respectively to the upper ends of the first and second racks 170, 171. A pinion 174 is rotatably mounted on a shaft 175 journalled in the movable block 167 and meshingly engage the first and second racks 170, 171, the axis of the shaft 175 being disposed parallel to the path of travel of the insulated wire 16. A pneumatic cylinder 176 is secured to the bottom of the movable block 167, and a piston rod 176a of the cylinder 176 is connected to the lower end of the second rack 171. The upper and lower jaws 172, 173 are moved toward and away from each other through the pinion 174 when the second rack 171 is vertically moved by the pneumatic cylinder 176. The slider member 164 has a pin (not shown) secured to one end thereof, the pin being received in the right end of the slot 150b (FIG. 10) and engaged with the end 158b of the spring-biased retaining bar 158. With this arrangement, when the movable block 167 and hence the slider member 164 are moved in a left-hand direction (FIG. 10), the retaining bar 158 is urged in a left-hand direction against the bias of the spring 160, with its end 158b displaced to the position shown in phantom in FIG. 10.

The first terminal fastening device 14 mounted on the frame 55 serves to fasten an electric terminal to the leading end of the insulated wire 16 from which the insulation has been stripped by the cutter and stripper mechanism 20, the insulated wire 16 being transferred to this terminal fastening position by the first moving mechanism 19 as will hereinafter more fully be described. The second terminal fastening device 180 mounted on the frame 55 serves to fasten an electric terminal to the stripped trailing end of the wire length severed from the insulated wire by the cutter and stripper mechanism 20, the wire length being transferred to this terminal fastening position by the second moving device 21. Thus, the terminals are applied to the opposite ends of the wire length.

The wire transport mechanism 182 is provided for transferring the wire length to the conveyor means 15. The wire transport mechanism 182 will be described with reference to FIGS. 13 and 14. A vertical shaft 183 is mounted on the frame, and a tubular member 184 is rotatably fitted on the shaft 184 and has a pair of upper and lower arms 184a, 184b extending perpendicularly therefrom at its upper and lower ends. An actuator rod 185 is pivotally connected to the lower arm 184b, the actuator rod 185 being driven by a drive means (not shown) for angularly moving the tubular member 184 about the shaft 183. A pneumatic cylinder 186 is mounted on the free end of the upper arm 184a. A cylinder housing 186a is mounted on the upper arm 184a for rotation about its axis disposed vertically. A pair of parallel shafts 187, 188 are rotatably journalled in the lower portion of the cylinder housing 186a, the two shafts extending perpendicular to the upper arm 184a. A pair of opposed jaws 189, 190 are secured to one ends of the shafts 187, 188, respectively while a pair of pinions 191, 192 are mounted on the other ends of the shafts, respectively. A rack 186b is formed on the lower portion of a piston rod 186c operatively associated with the cylinder housing 186a. The rack 186b is in mesh with the pinions 191, 192. A pair of air supply fittings 193, 194 are connected to the cylinder housing 186a for vertically moving the piston rod 186c along the cylinder housing 186a. With this construction, the pair of jaws 189, 190 are moved toward and away from each other by the pneumatic cylinder 186 to grip and release the wire length, as will hereinafter more fully be described. A pair of sprockets 196, 197 are fixedly secured to the upper end of the shaft 183 and the upper portion of the cylinder housing 186a, respectively. A chain 198 extends around the two sprockets 196, 197 so that the rotatable cylinder housing 186a is rotated in response to the rotation of the tubular member 184. In other words, the chain 198 prevents the cylinder housing 186a from freely rotating about its axis. With this arrangement, the wire length gripped by the pair of jaws 189, 190 is oriented in a predetermined direction when the tubular member 184 is angularly moved by the actuator rod 185.

Figure 15:
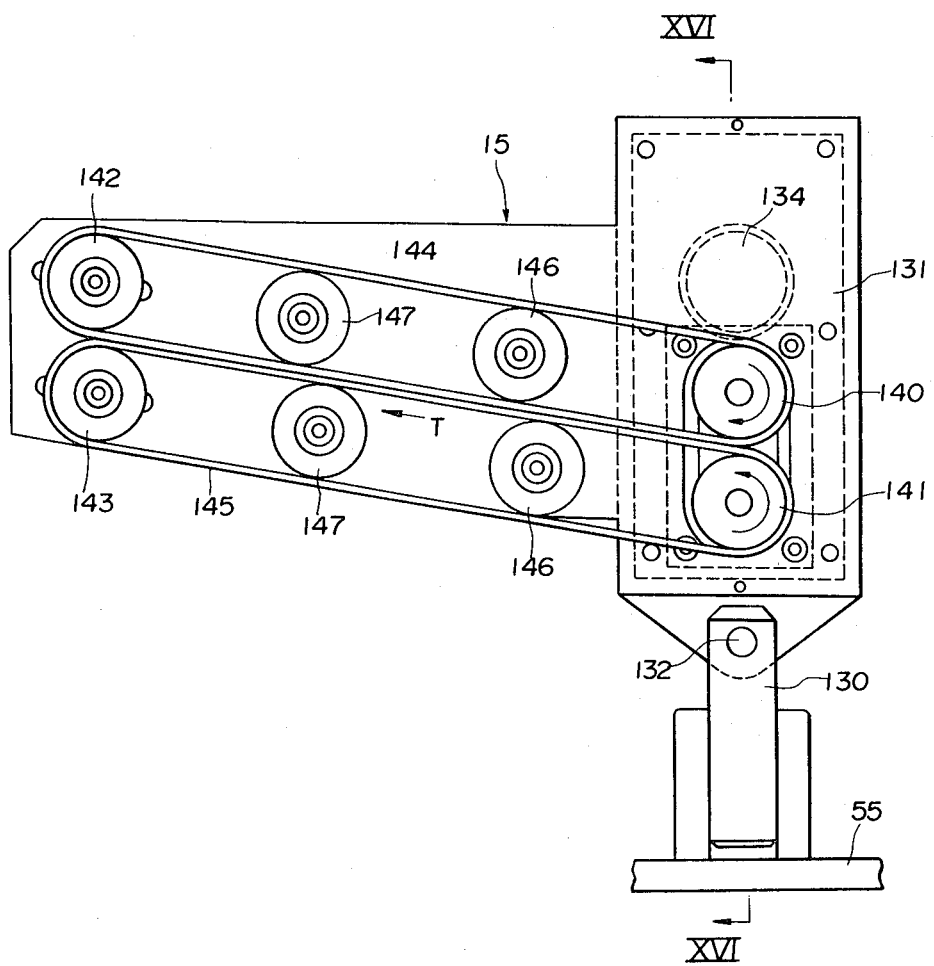
FIG. 15 is a front elevational view of a conveyor means.
Figure 16:
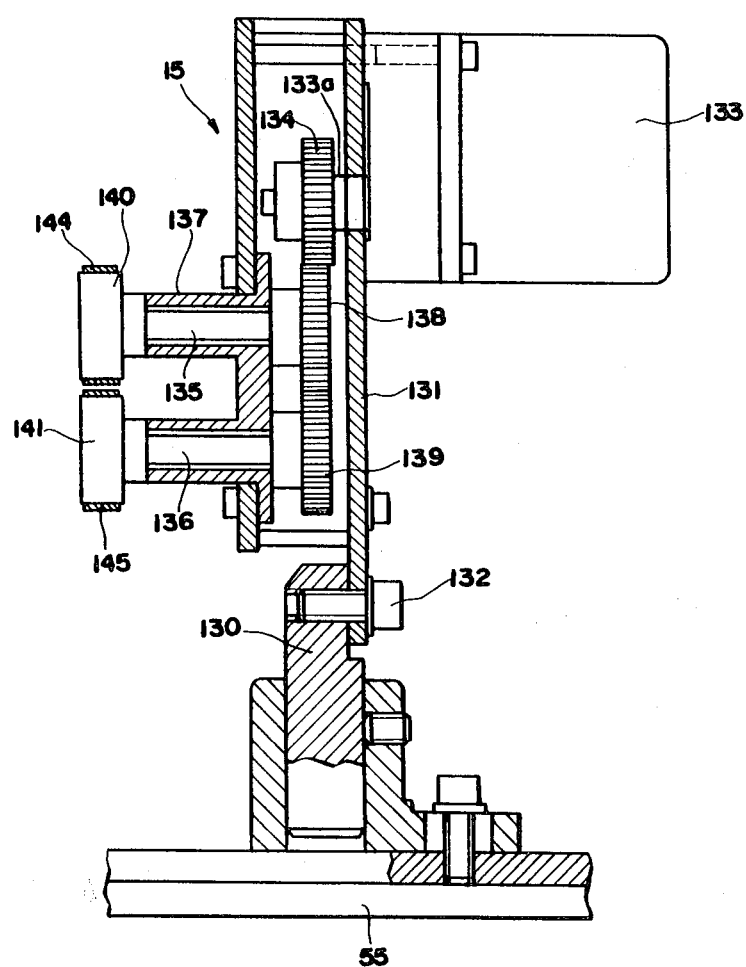
FIG. 16 is a cross-sectional view of the conveyor means taken along the line XVI—XVI.
Figure 17:
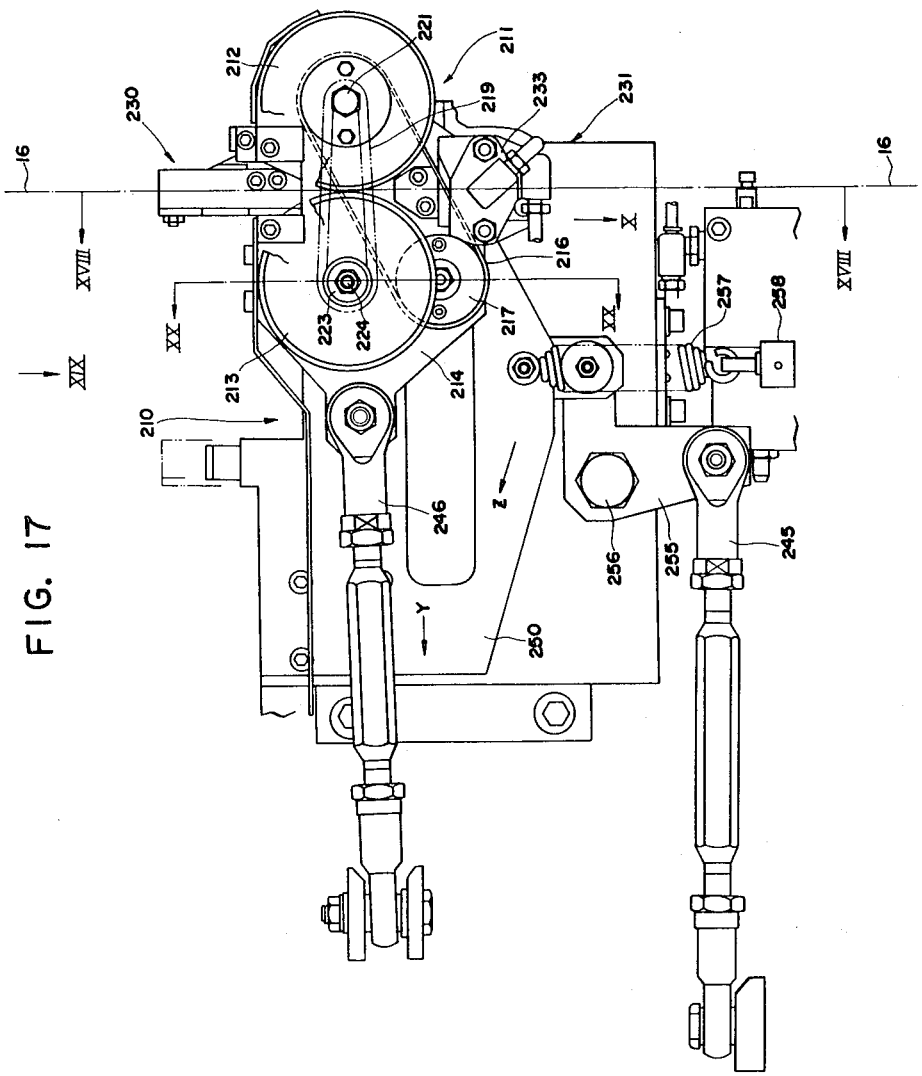
FIG. 17 is a top plan view of modified first moving mechanism and wire feed means.

As shown in FIG. 2, the conveyor means 15 is provided adjacent to the wire transport mechanism 12. The conveyor means 15 is described with reference to FIGS. 15 and 16. An upstanding support member 130 is mounted on the frame 55, and a mounting member 131 is mounted on the support member 130 by a bolt 132. A motor 133 is mounted on the mounting member 131, and a gear 134 is mounted on a drive shaft 133a of the motor 133. A pair of shafts 135, 136 are rotatably mounted on the mounting member 131 through a bearing member 137. A pair of gears 138, 139 are mounted on one ends of the shafts 135, 136, respectively. The gear 134 is in mesh with the gear 138 which in turn is in mesh with the gear 139. When the motor 133 is powered, the gears 138, 139 are rotated in opposite directions. A pair of opposed drive pulleys 140, 141 are fixedly mounted on the other ends of the shafts 135, 136. A pair of opposed driven pulleys 142, 143 are rotatably mounted on the mounting member 131, and a pair of belts 144, 145 extend around the respective drive and driven pulleys 140, 141, 142, 143 as shown in FIG. 13. Guide pulleys 146, 147 are arranged between each pair of drive and driven pulleys and rotatably mounted on the mounting member 131. The lower flight of the belt 144 and the upper flight of the belt 45 are held in contact with each other, the lower flight and the upper flight being moved in a direction T when the motor 133 is energized. The wire length is transferred to the conveyor means 15. Then, the wire length is held at one end between the aforesaid lower light and upper flight and conveyed into a storage position in an orderly manner.

Figure 21:
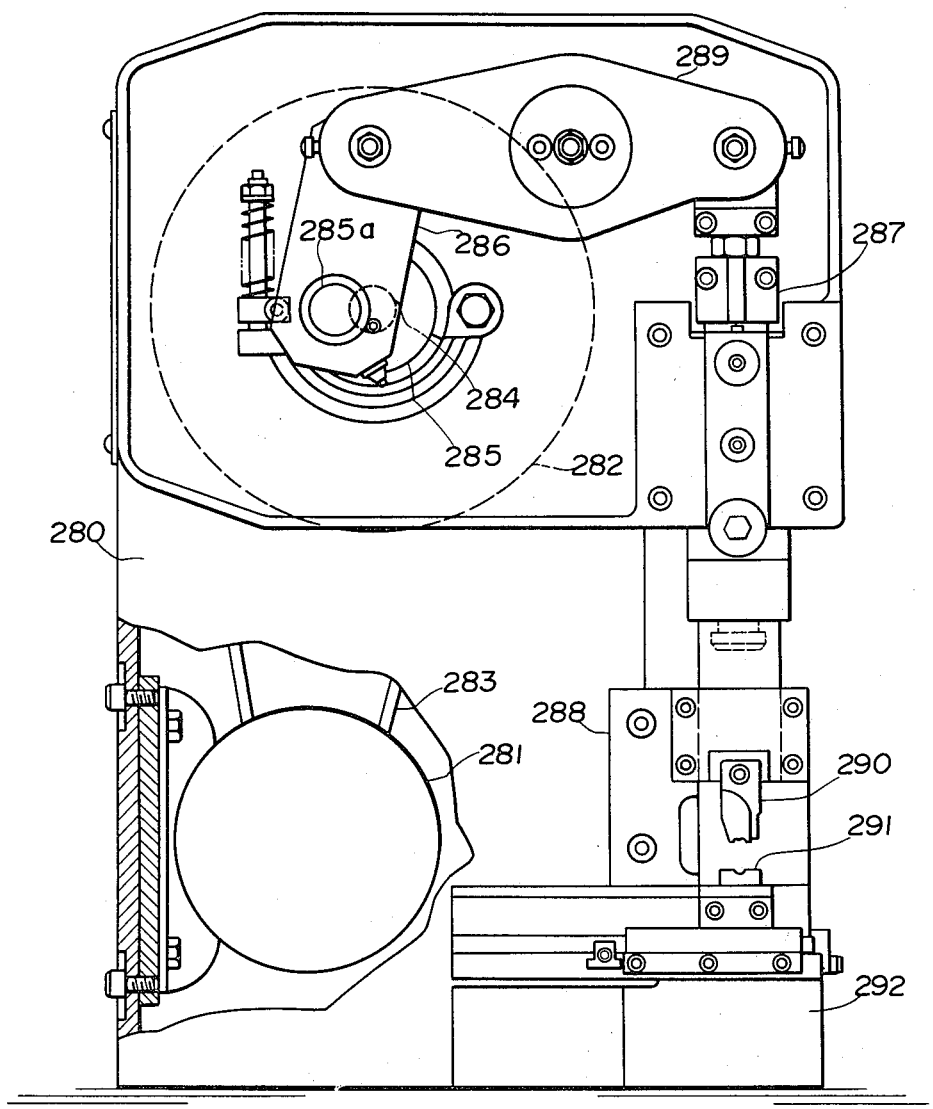
FIG. 21 shows the terminal fastening mechanism

As best shown in FIG. 21, each of the first and second terminal fastening devices 14, 180 comprises a housing 280, a motor 281 accommodated in the housing 280, a flywheel 282 connected to the motor 281 through a belt 283 and mounted on a horizontal shaft 284, a one way clutch (not shown) mounted on the shaft 284, a disc 285 with an eccentric pin 285a mounted on the shaft, a first link 286 connected at one end to the pin 285a, a ram assembly 287 extending through a guide block 288, a second link 289 connected at opposite ends to the first link 286 and the ram assembly 287, respectively, an upper die 290 mounted on the lower end of the ram assembly 287, and a lower die 291 mounted on a block 292. Although not shown in the drawings, a terminal feed mechanism is associated with the terminal fastening device for automatically feeding terminals to a position between the upper and lower dice 290, 291. The upper die 290 is moved toward and away from the lower die 291 for clamping an electrical terminal to the end of the wire or the wire length. An urging member 293 of an inverted L-shape (not shown in FIG. 21 but shown in FIG. 1) is secured to the ram assembly 287. When the ram assembly 287 is moved downwardly for effecting the terminal fastening operation, the urging member 293 is brought into engagement with the pivotal member 150 to angularly move the same in a counterclockwise direction (FIG. 10) against the bias of the spring 152.

A mode of operation of the wire end processing apparatus 10 will now be described.

The insulated wire 16 is supplied from the spool 17 and passes through the wire straightening means 11. Then, the wire 16 is intermittently advanced by the predetermined length by the wire length measuring device 12. The wire 16 is advanced by the wire feed means 18 through the first moving mechanism 19 and the cutter and stripper mechanism 20 into the second moving mechanism 21. The wire 16 is intermittently advanced by a predetermined length by the wire feed means 18 whereupon the rotation of the drive pulley 23 is stopped by means of an associated microswitch (not shown). The pair of jaws 32, 33 of the first clamp means 30 and the pair of jaws 42, 43 of the second clamp means 31 are respectively held apart from each other by the respective actuator arms 38, 50 urging the pin 35 and the pins 44, 45 upwardly. The pair of jaws 118, 119 and the pair of jaws 172, 173 are respectively held apart from each other. The upper and lower cutter and stripper blades are held apart from each other. When the rotation of the drive pulley 23 is stopped, the actuator arms 38 and 50 are angularly moved downwardly (FIGS. 5 and 6) so that the insulated wire 16 is gripped by the jaws 32, 33 and the jaws 42, 43. Also, the pneumatic cylinder 129 is actuated to retract the piston rod 129a so that the crank member 127 is angularly moved about the shaft 128 in a clockwise direction (FIG. 9). As a result, the rack 122 is urged downwardly under the bias of the tension spring 124 with the lower portion of the roller 123 brought into the position D so that the pair of jaws 118, 119 are moved toward each other through the rack 122 and pinions 120, 121 to grip the insulated wire 16 to properly position the wire 16. Then, the pneumatic cylinder 176 is actuated to extend the piston rod 176a to move the second rack 171 upwardly so that the first rack 170 is moved downwardly through the pinion 174 whereby the pair of jaws 172, 173 are moved toward each other to grip the insulated wire 16. Then, the cutter and stripper mechanism 20 is actuated to sever the wire 16 and cut through the insulation thereof on opposite sides of the line of severing of the wire. More specifically, the actuator 68 is angularly moved counterclockwise (FIG. 7) about the pivot point B so that the crank shaft 66 is rotated 180° into the position shown in FIGS. 7 and 8, the rotation of the crank shaft being effected through the rack 67 and pinion 66a. During this rotation of the crank shaft 66, the eccentric discs 71, 72 serve as crank arm means, and the slide member 82 is gradually moved downwardly while the slide member 81 is gradually moved downwardly so that the upper and lower blade holders 85, 86 are moved toward each other. Thus, the upper and lower cutter blades 90, 91 cooperate to sever the insulated wire 16, and simultaneously with the severing of the wire, the upper and lower stripper blades 92, 94 and the upper and lower stripper blades 93, 95 cut through the insulation of the insulated wire on opposite sides of the line of severing of the wire. When the angle between the vertical line and the line passing through the axis A of the crank shaft 66 and the centers $P_1$ and $P_2$ of the eccentric discs 71, 72 is small, that is to say, at an initial and a final portion of the stroke of the cutter and stripper blades, the amount of movement of these blades per unit time is small. Thus, by virtue of the provision of the eccentric discs 71, 72 mounted on the crank shaft 66, the amount of movement of the blades relative to the amount of angular movement of the actuator 68 is small at a final portion of the stroke of the blades. This ensures that the total amount of movement of the cutter and stripper blades is kept accurately to a predetermined level regardless of backlash and play in the drive system for these blades. Thus, the upper and lower stripper blades 92, 93, 94, 95 properly cut through the insulation of the insulated wire 16.

After the wire 16 is severed with the insulation cut through, the first moving mechanism 19 is actuated. More specifically, the pivotal member 60 is rotated about the shaft 61 by the actuator rod 62 into the position shown in phantom in FIG. 3 so that the movable table 27 is moved in the direction X to strip the insulation from the leading end of the wire held by the clamp means 30, 31. Subsequently, the actuator rod 57 is moved in the direction Y so that the cross slide 56 is moved in the direction Z with the guide roller 58 moving along the guide groove 60b. In this condition, the leading end of the wire is positioned in the terminal fastening device 14 where a terminal is automatically fastened to the leading end of the wire. Then, the movable table 27 is returned to its initial position shown in FIG. 3.

Figure 11:
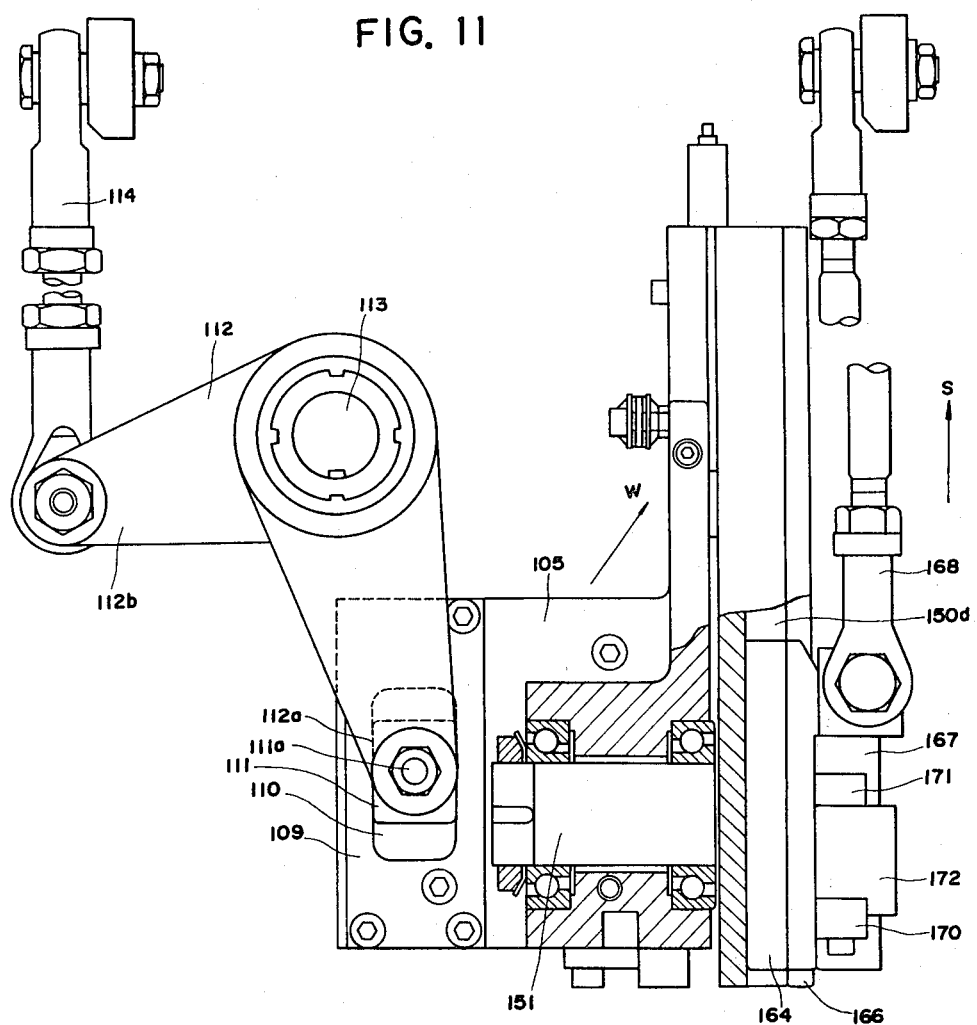
FIG. 11 is a horizontal cross-sectional view taken along the line XI—XI of FIG. 9.

Simultaneously with the operation of the pivotal member 60, the actuator rod 114 is actuated to angularly move the crank member 112 about the shaft 113 in a clockwise direction (FIG. 11) so that the carriage 105 is moved along the guide rail 104 in a left-hand direction (FIGS. 9 and 10) whereby the pair of jaws 172, 173 strip the insulation from the trailing end of the severed wire length. As the carriage 105 is moved in the left-hand direction, the roller 123 is rollingly moved along the cam surface 127a, and the lower portion of the roller 123 is disposed in the position E (FIG. 9) so that the pair of jaws 118, 119 are moved away from each other to release the wire length. Then, the actuator rod 168 is actuated to move the movable block 167 along the guide channel 150d in the direction indicated by an arrow S (FIG. 11). Simultaneously with this movement of the movable block 167, the actuator rod 114 is actuated to angularly move the crank member 112 about the shaft 113 in a counterclockwise direction (FIG. 11) so that the carriage 105 is moved along the guide rail 104 in a right-hand direction (FIG. 11). Therefore, the movable block 167 is moved in the direction W, that is, obliquely relative to the path of travel of the insulated wire 16. In this condition, the trailing end of the wire length is disposed adjacent to the second terminal fastening device 180, the wire length being gripped by the jaws 172, 173. When the movable block 167 moves along the guide channel 150d, the retaining bar 158 is urged in a left-hand direction against the bias of the spring 160, with its end 158b displaced to the position shown in phantom in FIG. 10. Therefore, the engagement of the retaining bar 158 with the retaining plate 161 is released. However, the pivotal member 150 is still held by the tension spring 152 in the position shown in FIG. 10. Then, the second terminal fastening device 180 applies an electric terminal to the trailing end of the wire length by pressing. At this time, the pivotal member 150 is pivotally moved about the shaft 151 in a counterclockwise direction (FIG. 10) by the urging member 293 against the bias of the spring 152 so that the pivotal member 150 urges the head 162b of the piston rod 162a downwardly. When the terminal is fastened to the trailing end of the wire length, the pneumatic cylinder 162 is actuated to extend the piston rod 162a so that the pivotal member 150 is returned to the position shown in FIG. 10. At this time, the tension spring 152 assists in returning the pivotal member 150 to this position. Then, the pair jaws 189, 190 held apart are moved toward each other by the upward movement of the piston rod 186c to grip the wire length. Then, the pair of jaws 172, 173 are moved apart from each other through the operation of the pneumatic cylinder 176 to release the wire length. The actuator rod 185 is actuated to angularly move the tubular member 184 about the shaft 183 so that the jaws 189, 190 gripping the trailing end of the wire length are moved to a position adjacent to the conveyor means 15. Then, the pneumatic cylinder 186 is actuated to downwardly move the piston rod 186c so that the pair of jaws 189, 190 are moved away from each other through the rack 186b and pinions 191, 192 to release the wire length. Then, the trailing end of the wire length is introduced between the conveyor belts 144, 145 by a guide means (not shown) associated with the conveyor means 15 and is conveyed in the direction T into the storage position. The wire length so conveyed is stored in an orderly manner. A bundle of wire lengths are tied together by a fastening means (not shown). Then, the tubular member 184 is rotated into the initial position by the actuator rod 185, and the movable block 167 is returned to the initial position by the actuator rod 168. When the movable block 167 is moved to this initial position, the retaining bar is urged by the spring 160 in a right-hand direction (FIG. 10) with its end 158b disposed in contact with the upper edge of the retaining plate 161. Thus, the pivotal member 150 is positively held against pivotal movement about the shaft 151 in a counterclockwise direction (FIG. 10). During the movement of the movable block 167 into the initial position, the pneumatic cylinder 129 is actuated to extend the crank member 127 so that the lower portion of the roller 123 is disposed in the position E (FIG. 9) to move the pair of jaws 118, 119 away from each other. This cycle of operation is repeated.

Figure 20:
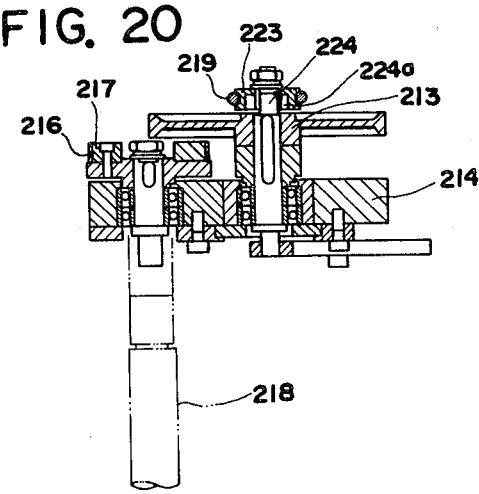
FIG. 20 is a cross-sectional view taken along the line XX—XX of FIG. 17.

FIGS. 17 to 20 show modified first moving mechanism 210 and wire feed means 211 which can be replaced by the first moving mechanism 19 and the wire feed means 18. A pair of opposed drive and driven pulleys 212, 213 are mounted on a movable table 214 as described above for the wire feed means 18. The insulated wire 16 is gripped by the peripheries of the pulleys 212, 213 and fed by a predetermined length. The wire feed means 211 differs from the wire feed means 18 in that the drive pulley 212 is driven through a belt 216 extending around a wheel 212a of the drive pulley 212 and a pulley 217 mounted on a drive shaft 218 of a drive means (not shown) and in that the drive and driven pulleys 212, 213 are urged toward each other by an annular coil spring 219 and a tension spring 220. A guide pulley 221 is fixedly secured to the upper end of a shaft 222 on which the drive pulley 212 is mounted. Another guide pulley 223 is rotatably mounted on a shaft 224 through a bearing means 224a as shown in FIG. 20, the driven pulley 213 being mounted on the shaft 224. The spring 219 extends around the guide pulleys 221, 223. The shaft 224 is journalled in a bearing member 225 mounted on the movable table 214 for slight movement in a direction perpendicular to the path of travel of the insulated wire 16. A pin 226 is secured to the movable table 214 adjacent to the shaft 222. The spring 220 acts between the bearing member 225 and the pin 226. Thus, the drive and driven pulleys 212, 213 are urged toward each other to positively grip the insulated wire 16.

Figure 18:
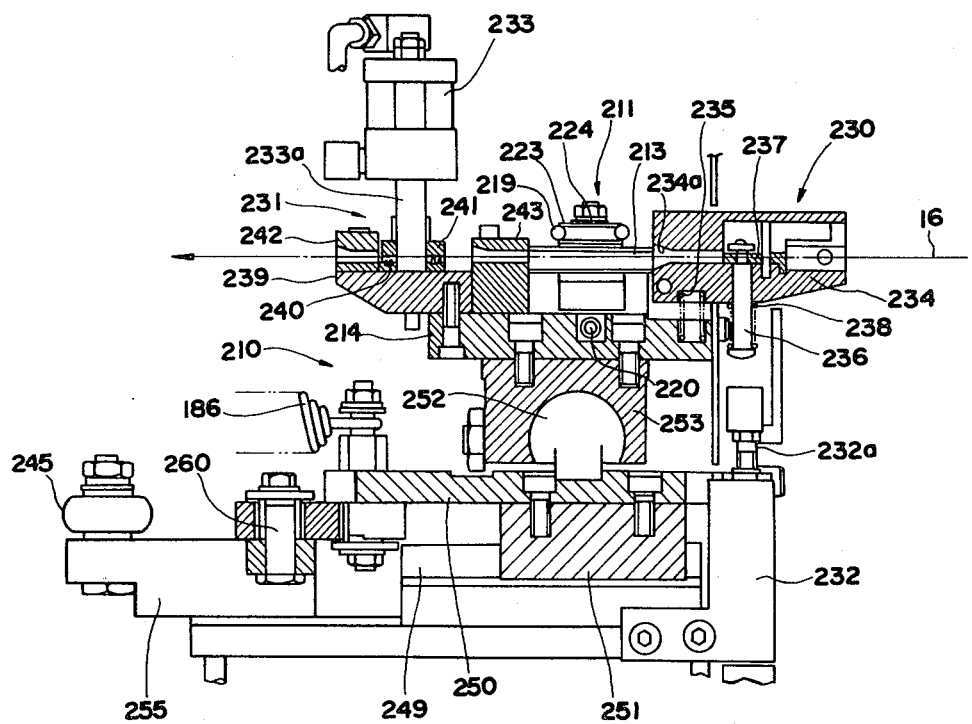
FIG. 18 is a cross-sectional view taken along the line XVIII—XVIII of FIG. 17.
Figure 19:
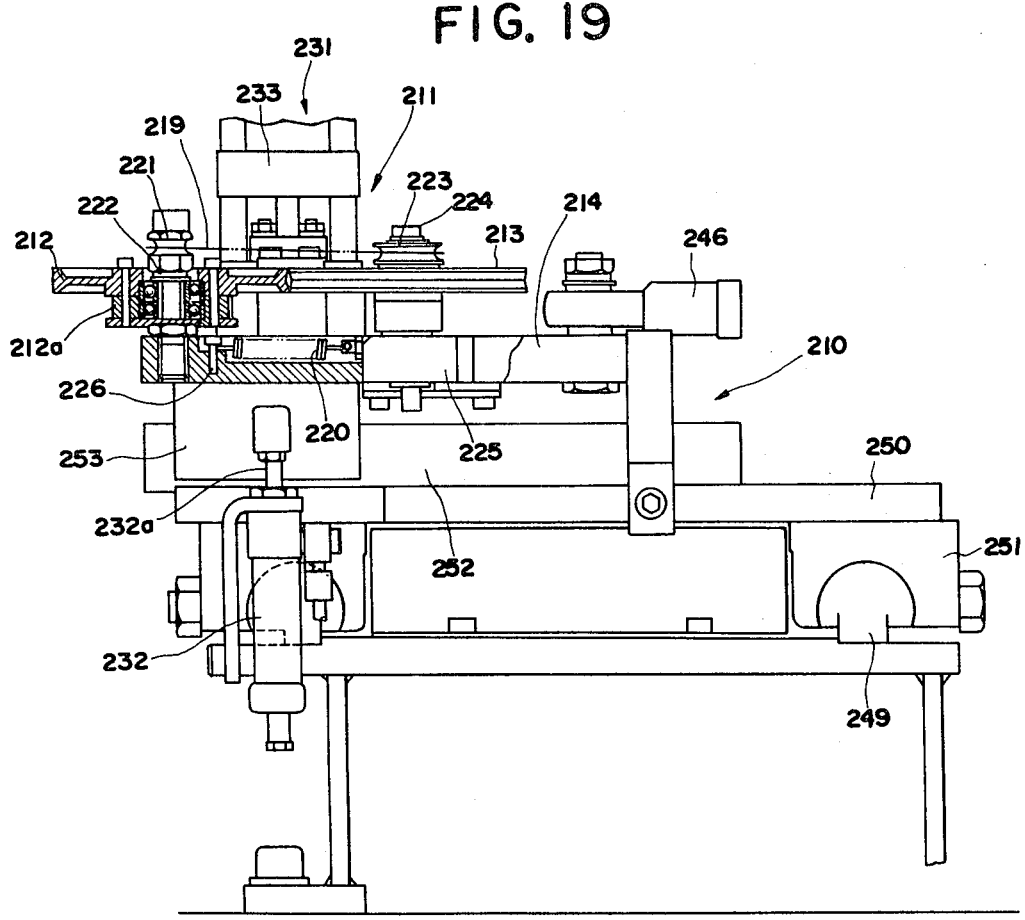
FIG. 19 is a partly-broken, side elevational view as viewed in the direction XIX of FIG. 17.

A pair of first and second wire clamp means 230, 231 are arranged on the movable table 214 disposed on opposite sides of the wire feed means 211 as described above for the first and second wire clamp means 30, 31. The clamp means 230, 231 are actuated by a pair of pneumatic cylinders 232, 233. As shown in FIG. 18, the first clamp means 230 comprises a housing 234 through which the insulated wire 16 is passed, the housing 234 having a passageway 234a which serves to guide the movement of the insulated wire. The housing 234 is resiliently mounted on the movable table 214 through a coil spring 235 to allow slight vertical movement of the housing. A pin 236 slidably extends through the lower portion of the housing 234. A clamp element 237 is secured to the upper end of the pin 236. A coil spring 238 is wound around the pin 236 and acts between the lower outer surface of the housing and the lower end of the pin 236 to urge the clamp element 237 against the active clamp surface of the housing. The pneumatic cylinder 232 is mounted on the frame and has a piston rod 232a operatively associated therewith. The head of the piston rod 232a is disposed beneath the lower end of the pin 236. The pneumatic cylinder 232 is actuated to extend its piston rod 232a so that the pin 236 is urged upwardly to move the clamp element 237 away from the clamp surface. Thus, the clamp element 237 and the cooperating clamp surface grip and release the insulated wire through the operation of the pneumatic cylinder 232. The second clamp means 231 comprises a base 239 mounted on the movable table 214. A lower clamp element 240 is secured to the base 239 while an upper clamp element 241 is secured to a piston rod 233a of the pneumatic cylinder 233, the cylinder 233 being mounted on the base 239 through a mounting means (not shown). The upper clamp element 241 is moved toward and away from the lower clamp element 240 through the operation of the cylinder 233 to grip and release the insulated wire 16. A pair of guide members 242, 243 are mounted on the base 239 and the movable table 214, respectively, the guide members 242, 243 having respective passageways through which the insulated wire is passed.

The operation of the first moving mechanism 210 will be described. The movable table 214 is moved in directions X, Y and Z (FIG. 17) by actuator rods 245, 246 as described above for the movable table 27. More specifically, a guide member 249 is mounted on the frame and extends parallel to the path of travel of the insulated wire 16. A movable plate 250 is secured to a block 251 which is mounted on the guide rail 249 for sliding movement therealong. A guide rail 252 is mounted on the movable plate 250 and extends perpendicular to the path of travel of the insulated wire 16. The movable table 214 is secured to a block 253 which is mounted on the guide rail 252 for sliding movement therealong. The actuator rod 245 is connected to the movable plate 250 through a crank member 255 pivotally mounted on the frame by a shaft 256. Also, the actuator rod 246 is pivotally connected to the movable table 214 by a pin 260. A tension spring 257 acts between the movable plate 250 and a support member 258 mounted on the frame for normally urging the movable plate 250 in the direction X. Thus, the first moving mechanism 210 and the wire feed means 211 perform the same functions that the first moving mechanism 19 and the wire feed means 18 do.

While the wire end processing apparatus according to the invention has been specifically shown and described herein, the invention itself is not to be restricted by the exact showing of the drawings or the description thereof. For example, although the leading end of the wire and the trailing end of the wire length are horizontally moved obliquely relative to the path of travel of the wire, they may be moved obliquely in directions other than the horizontal direction such as generally vertical direction.

What is claimed is:
1. A wire end processing apparatus which comprises:
(a) a wire feed means for advancing an insulated wire a predetermined length;
(b) a cutter means operable to cut the insulated wire to a predetermined length;

(c) a first clamp means arranged on the wire inlet side of said cutter means and operable to clamp the wire;

(d) a second clamp means arranged on the wire outlet side of said cutter means and operable to clamp the wire;

(e) a first fastening means for fastening a terminal to the leading end of the wire;

(f) a second fastening means for fastening a terminal to the trailing end of the wire length;

(g) a first moving means operable to first move said first clamp means away from said cutter means along the path of travel of the wire and then to move said first clamp means toward said cutter means obliquely relative to the path of travel of the wire to thereby bring the leading end of the insulated wire into said first fastening means; and (h) a second moving means operable to first move said second clamp means away from said cutter means along the path of travel of the wire and then to move said second clamp means toward said cutter means obliquely relative to the path of travel of the wire to thereby bring the trailing end of the wire length into said second fastening means.

2. An apparatus according to claim 1, in which said second moving means comprises a carriage mounted on a frame for horizontal movement along the path of travel of the wire, an elongated pivotal member mounted on said carriage for pivotal movement in a vertical plane perpendicular to the path of travel of the wire and extending perpendicular to the path of travel of the wire, and a movable block mounted on said pivotal member for movement therealong; said second clamp means comprising a pair of vertical spaced racks vertically movably supported by said movable block, a pinion rotatably supported by said movable block and interposed between and meshingly engaging said pair of racks, and a pair of opposed upper and lower clamp jaws secured respectively to the upper ends of said racks, and one of said racks being connected to a drive means for being vertically moved to move said jaws toward and away from each other.

3. An apparatus according to claim 2, further including a third wire clamp which comprises a pair of opposed jaws mounted on said carriage and having pinion means, a rack vertically movably supported by said carriage and meshingly engaged said pinion means, a crank member pivotally mounted on the frame and having a cam surface with which the lower end of said rack is disposed in contact for movement therealong, and a tension spring acting between said rack and said carriage for normally urging said rack downwardly, whereby the pivotal movement of said crank member causes said rack to move upwardly to move said opposed jaws away from each other, and whereby when said carriage is moved away from said cutter means, said rack is moved upwardly.

4. An apparatus according to claim 1, further comprising a wire conveyor means and a wire transport means for transferring the wire length from said second fastening means to said conveyor means.

5. An apparatus according to claim 4, in which said wire transport mechanism comprises a vertical shaft mounted on the frame, a tubular member rotatably fitted over said shaft and having a horizontal arm, a power cylinder housing mounted on the free end of said arm for rotation about its axis disposed vertically, a piston rod operatively associated with said cylinder housing and having a rack portion, a pair of opposed jaws supported by said cylinder housing and having pinion means meshingly engaged with said rack portion so that said jaws are moved toward and away from each other by the movement of said piston rod, a first pulley fixedly secured to the upper end of said shaft, a second pulley mounted on said cylinder housing for rotation about its axis vertically disposed, and a chain extending around said pulleys.

6. An apparatus according to claim 1, in which said first moving means comprises a first movable member mounted on said frame for horizontal movement along the path of travel of the wire, and a second movable member mounted on said first movable member for horizontal movement in a direction perpendicular to the path of travel of the wire; said first clamp means comprising a pair of clamp devices each having a pair of clamp elements one of which is movable by a power cylinder toward the other to hold the insulated wire.

7. An apparatus according to claim 6, in which said wire feed means comprises a pair of first and second vertical shafts mounted on said second movable member, said second shaft being horizontally movable relative to said first shaft; a pair of horizontally disposed drive and driven pulleys mounted respectively on said first and second shafts; and a pair of first and second urging means urging said second shaft toward said first shaft to hold the periphery of said driven pulley against the periphery of said drive pulley, said first urging means extending between the upper ends of said first and second shafts, and said second urging means acting between the lower end of said second shaft and that portion of said second movable member adjacent said first shaft.

* * * * *